United States Patent [19] [11] 4,056,157
Kawata [45] Nov. 1, 1977

[54] ELECTRONIC SPEED CONTROL SYSTEM FOR AUTOMOTIVE VEHICLES

[75] Inventor: Shoji Kawata, Okazaki, Japan

[73] Assignee: Aisin Seiki Kabushiki Kaisha, Kariya, Japan

[21] Appl. No.: 711,807

[22] Filed: Aug. 5, 1976

[30] Foreign Application Priority Data

Aug. 8, 1975 Japan ................................. 50-96857

[51] Int. Cl.² ........................................... B60K 31/00
[52] U.S. Cl. ................................. 180/105 E; 123/102
[58] Field of Search .......................... 180/105 E, 108; 123/102, 108; 307/242; 317/148.5

[56] References Cited

U.S. PATENT DOCUMENTS

| 3,575,256 | 4/1971 | Jania | 180/105 E |
| 3,599,052 | 8/1971 | Carp | 317/148.5 |
| 3,648,798 | 3/1972 | Jania | 180/105 E |
| 3,895,684 | 7/1975 | Takeshi | 180/105 E |

Primary Examiner—Joseph F. Peters, Jr.
Assistant Examiner—Terrance L. Siemens
Attorney, Agent, or Firm—Berman, Aisenberg & Platt

[57] ABSTRACT

In an electronic speed control circuit for automotive vehicles, a memory capacitor is connected at one end thereof to a speed signal generator and at the other end thereof to the gate of a field effect transistor to memorize a command speed signal. The electronic control circuit comprises a setting circuit for momentarily applying a constant voltage to a common junction between the gate of the field effect transistor and the memory capacitor. The setting circuit includes a second field effect transistor whose source is connected to a constant voltage circuit and whose drain is connected to the common junction between the memory capacitor and the first-named field effect transistor and a manual control circuit connected to the gate of the second field effect transistor to normally connect the gate of the second field effect transistor to the ground and to momentarily connect the constant voltage circuit to the gate of the second field effect transistor upon actuation of the manual control circuit.

9 Claims, 5 Drawing Figures

ELECTRONIC SPEED CONTROL SYSTEM FOR AUTOMOTIVE VEHICLES

BACKGROUND OF THE INVENTION

The present invention relates to an electronic automatic speed control system for automotive vehicles, and more particularly to an improvement in an electronic speed control circuit of the type in which a memory in the form of a capacitor is provided to couple a speed signal proportional to an actual vehicle speed to a high input impedance terminal of a high input impedance amplifier to memorize a command signal therein.

In conventional electronic speed control circuits of this kind, as disclosed in the U.S. Pat. No. 3,455,411 patented on July 15, 1969 and U.S. Pat. No. 3,895,684 patented on July 22, 1975, a memory capacitor is connected at one end thereof to a speed signal generator and at the other end thereof to the conrol electrode of a high input impedance amplifier in the form of a field effect transistor to memorize a command speed signal. In the operation of the speed control circuits, a command speed signal is stored in the memory capacitor by momentarily connecting the common terminal between the capacitor and the high input impedance amplifier to a given voltage so that the command speed signal is memorized in the capacitor over a long period of time by means of the high input impedance property of the field effect transistor. Thereafter, an error signal developed in the field effect transistor is amplified and applied to a vacuum modulator which controls the pressure in a vacuum motor which, through a linkage, positions the vehicle throttle.

In the above-mentioned memory circuit, it is, however, observed that over a period of time the electric potential of the capacitor gradually increase at the connecting side of the field effect transistor, because the electric current fed to the drain of the field effect transistor, leaks slightly toward the capacitor from the gate of the transistor. As a result, the memorized command speed signal voltage becomes large in value so that the actual controlled speed of the vehicle becomes lower than the command speed. Furthermore, in the above-mentioned speed control circuit, a negative feedback circuit is provided to be regulated by a potentiometer which is actuated in response to movement of the vacuum motor such that the feedback circuit acts to regulate the error signal generated from the field effect transistor so as to improve response and stability of the speed control circuit. It is, however, also observed that the actual speed of the vehicle maintained by the speed control circuit is gradually decreased due to regulation of the error signal unless compensation means is adapted to the speed control circuit to compensate for the function of the feedback circuit.

SUMMARY OF THE INVENTION

The primary object of the present invention is to provide an improved memory circuit for an electronic speed control system of the above-mentioned type, in which a memorized command speed signal voltage stored in a memory capacitor is not influenced by leakage current passing across a high input impedance amplifier in the form of a field effect transistor so as to constantly maintain the command speed over a long period of time.

Another object of the present invention is to provide an improved memory circuit for an electronic speed control system of the above-mentioned type, having the above-mentioned characteristics, wherein a compensation circuit is adapted to compensate for the function of a negative feedback circuit for the speed control circuit.

In the preferred embodiment of the present invention, these and other objects are accomplished by providing an electronic speed control system for automatically controlling the speed of a vehicle having an actuator for a throttle valve of the vehicle, which comprises a speed signal generator for generating a speed signal voltage proportional to an actual speed of the vehicle; a memory circuit including a memory capacitor and a high input impedance amplifier, the capacitor being connected at one end thereof to an output terminal of the speed signal generator and at the other end thereof to a control electrode of the high input impedance amplifier; a setting means for momentarily connecting a constant voltage circuit to a common junction between the control electrode of the high input impedance amplifier and the memory capacitor to store a command speed voltage in the memory capacitor in response to an actual speed signal voltage generated from the speed signal generator; and a comparison circuit connected to the memory circuit for operating the throttle valve actuator by comparing an output voltage of the high input impendance amplifier with a reference voltage. The electronic speed control system is characterized in that the setting means comprises a second high input impedance amplifier whose input terminal is connected to the constant voltage circuit and whose output terminal is connected to the common junction between the memory capacitor and the first-named high input impedance amplifier and a manual control means connected to the control electrode of the second high input impedance amplifier to normally connect the control electrode of the second high input impedance amplifier to the ground and to momentarily connect the constant voltage circuit to the control electrode of the second high input impedance amplifier upon actuation of the manual control means.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
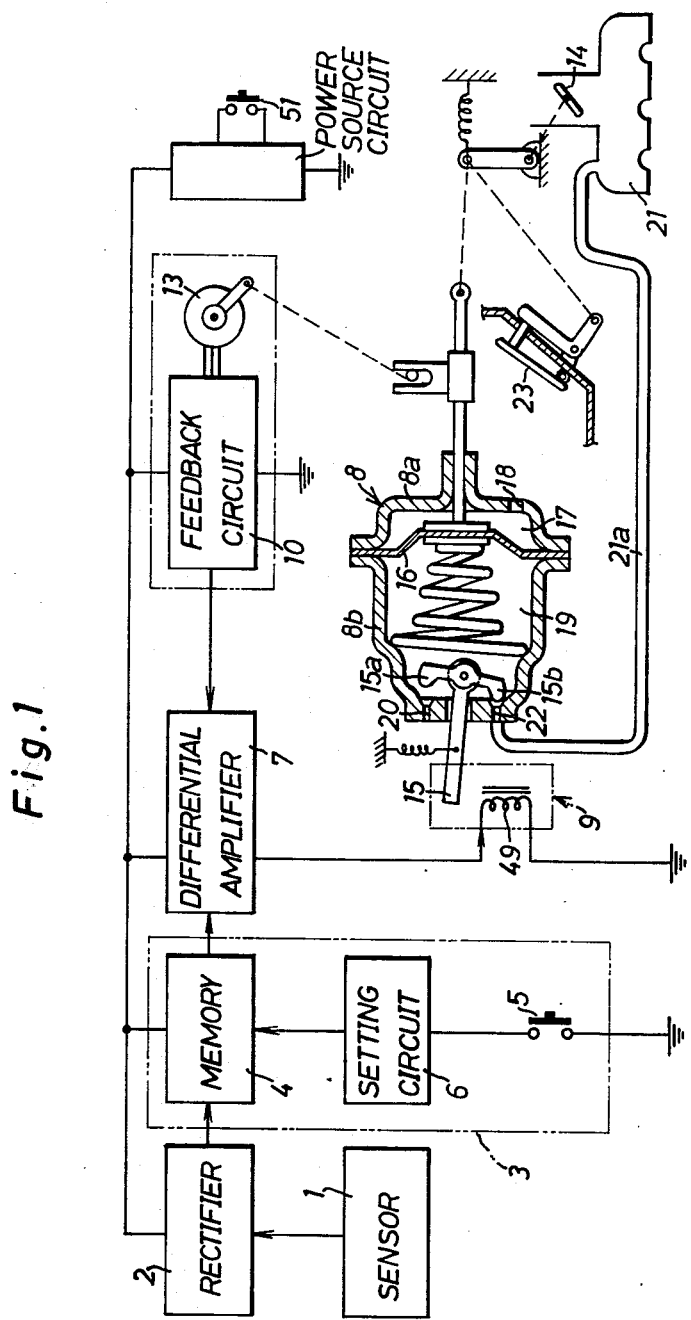
FIG. 1 shows a block diagram of an electronic control circuit and a throttle valve control mechanism for an electronic speed control system in accordance with the present invention.

Referring now to the drawings, particularly in FIG. 1 there is illustrated a block diagram of an electronic control circuit and a throttle valve control mechaism for an electronic speed control system in accordance with the present invention. The electronic control circuit includes a speed sensor 1 which is operatively connected to a speedometer cable and driven at the same speed as the speedometer to generate a speed signal in response to the travelling speed of a vehicle. The speed signal is rectified by a bridge rectifier 2 to be applied to a memory circuit 3. The memory circuit 3, as clearly described hereinafter in detail, comprises a memory capacitor 4 which is connected at one end thereof to the gate of a field effect transistor and at the other end thereof to the speed sensor 1 through the rectifier 2. The memory capacitor 4 is set by a setting circuit 6 to memorize a command speed signal when a set switch 5 is momentarily actuated.

The electronic speed control circuit further comprises a differential amplifier 7 which is connected to the output terminal of the memory circuit 3 to detect an error signal by comparing the instantaneous output signal from the memory circuit 3 with a constant voltage, the output error signal being amplified. The differential amplifier 7 is further connected at the input terminal thereof to a negative feedback circuit 10 and at the output terminal thereof to an electromagnetic actuator 9 to move a vacuum motor 8, which is operatively connected to a throttle valve 14 by way of a flexible wire. The negative feedback circuit 10 includes a potentiometer 13 which is actuated in response to movement of the vacuum motor 8. Thus, the negative feedback circuit 10 controls an input signal applied to the differential amplifier 7 in response to movements of the vacuum motor 8 faster than the vehicle speed is actually regulated responsive to movements of the throttle valve 14.

The vacuum motor 8 comprises casings 8a and 8b in which a diaphragm piston 16 forms an air chamber 17 and a vacuum chamber 19. The air chamber 17 is provided with a vent hole 18 and the vacuum chamber 19 is provided with a vent hole 20 and a vacuum inlet port 22, which is connected to an intake manifold 21 by way of a conduit 21a. The vacuum motor 8 further comprises a valve lever 15 which is journalled within the vacuum chamber 19 and provided thereon with a pair of valve bodies 15a and 15b to selectively close the vent hole 20 and the inlet port 22. In this vacuum motor 8, when the electomagnetic actuator 9 is energized by an output signal from the differential amplifier 7 the valve lever 15 is moved down to close the vent hole 20 by the valve body 15a, and when the actuator 9 is deenergized the valve lever 15 is moved up to close the vacuum inlet port 22. Thus, when the vent hole 20 is closed the vacuum motor 8 moves in accordance with the pressure difference between the air chamber 17 and the vacuum chamber 19 so as to increase the degree of opening of the throttle valve 14, and when the vacuum inlet port 22 is closed the vacuum motor 8 is returned to the original position so as to decrease the degree of opening of the throttle valve 14.

Figure 2:
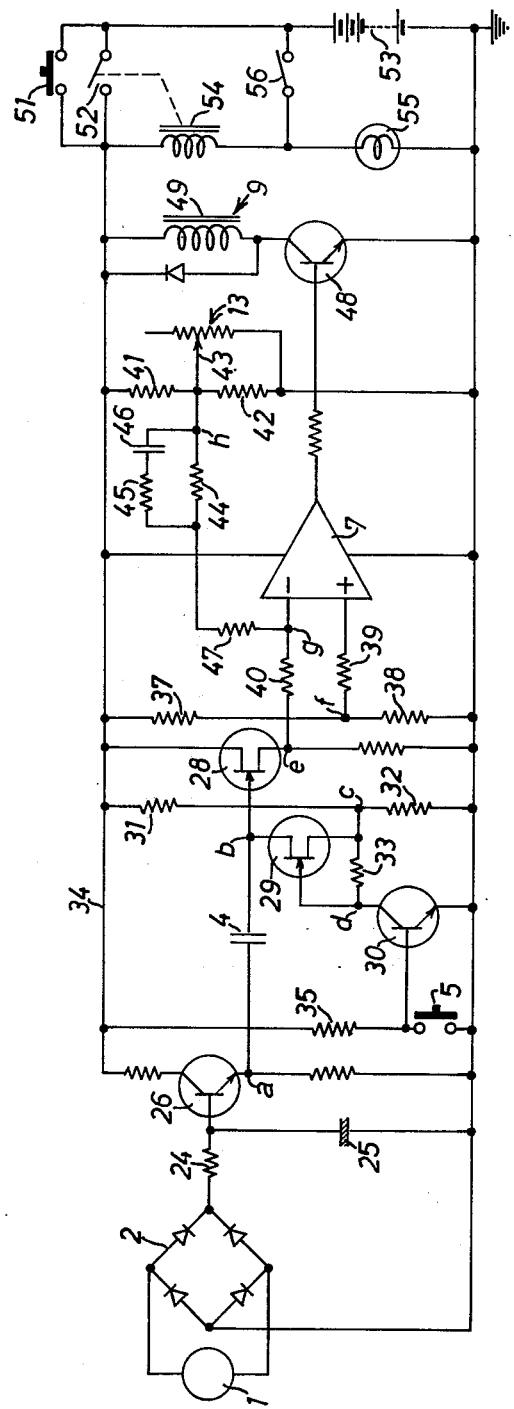
FIG. 2 shows a complete circuit diagram of the electronic control circuit shown in FIG. 1.

FIG. 2 discloses the electronic speed control circuit discussed with reference to the block diagram of FIG. 1. In this control circuit, a speed signal generated from the speed sensor 1 is rectified by the bridge rectifier 2 and smoothed by a smoothing circuit including a resistor 24 and a capacitor 25. The smoothed speed signal is fed to the base of a transistor 26 and appears at the emitter $a$ of transistor 26 as a signal proportional to the vehicle speed. In the previously described memory circuit 3, the memory capacitor 4 is connected at one end thereof to the emitter $a$ of transistor 26 and at the other end thereof to the gate of a first field effect transistor 28. The setting circuit 6 comprises a second field effect transistor 29 and a transistor 30. The second field effect transistor 29 is connected at the drain thereof to a common terminal $b$ between the memory capacitor 4 and the first field effect transistor 28, and at the gate thereof to the collector of the transistor 30. The source of the transistor 29 is connected at a point $d$ to the collector of transistor 30 through a resistor 33 and further connected at a point $c$ to a voltage divider circuit composed of resistors 31 and 32. Each value of the resistors 31 and 32 is predetermined such that the divided constant voltage Vc becomes constantly higher than a maximum speed signal voltage appearing at the emitter point $a$ of transistor 26. Moreover, the base of transistor 30 is connected to an electric source line 34 through a resistor 35 and is grounded by way of the set switch 5, which is a normally open type push-button switch.

In the memory circuit 3 mentioned above, when the set switch 5 is in its normal open position, the transistor 30 is turned on and the field effect transistor 29 is turned off since the gate of transistor 29 is grounded across the transistor 30. In this instance, at the common terminal $b$ between the capacitor 4 and the first field effect transistor 28, a positive voltage is maintained which is essentially equal to the sum of the voltage stored in the capacitor 4 and the voltage appearing at the emitter point $a$ of transistor 26. Thus, the voltage the point $b$ is applied to the gate of transistor 28 to generate at the source of transistor 28 an output voltage Ve. When the set switch 5 is momentarily closed, the transistor 30 is instantly turned off so that a divided constant voltage Vc at point $c$ is applied to the gate of transistor 29 across the resistor 33 to turn on the transistor 29. Then, the divided constant voltage of point $c$ appears at the common terminal $b$ across the transistor 29 and is applied to one end of the capacitor 4. At the same time, a voltage Va appearing at point $a$ is applied to the other end of the capacitor 4 so that the voltage Vb - Va is charged and memorized in the capacitor 4 as a command speed voltage in response to the instant vehicle speed. Thus, the command speed voltage memorized in the capacitor 4 will remain substantially constant after the set switch 5 opens. Thereafter, if the voltage Va of point $a$ increases or decreases, the voltage of point $b$ will increase or decrease in proportion to the changes in the voltage Va and, in turn, the output voltage Ve of the field effect transistor 28 will increase or decrease. Under such conditions, if an electric source current leaks toward the common terminal $b$ across the drain and gate of transistor 28, the leakage current will flow across the drain and gate of transistor 29 toward the collector of transistor 30, which is normally turned on. As a result, the command speed voltage memorized in the capacitor 4 will remain unchanged without being influenced by the leakage current.

To detect an error signal by comparing the instantaneous output voltage from the memory circuit 3 with a constant voltage, the differential amplifier 7 is connected at its positive terminal to a voltage divider circuit composed of resistors 37 and 38 across a resistor 39, and is further connected at its negative terminal to the output terminal $e$ of the field effect transistor 28 across a resistor 40. The negative terminal of the differential amplifier 7 is also connected at a point $g$ to the negative feedback circuit 10 which delivers a feedback voltage thereto.

In the negative feedback circuit 10, the potentiometer 13 is connected to a voltage divider circuit composed of resistors 41 and 42 to generate a feedback voltage at a point *h* responsive to the throttle movements. The point *h* is connected to the point *g* across resistors 44 and is 47 and further connected to a capacitor 46 and a resistor 45, which are connected in parallel to the resistor 44. The resistor 44 serves to generate a D.C. voltage level proportional to the operation of the potentiometer 13, while the resistor 45 and the capacitor 46 serve to generate an A.C. voltage level proportional to the operation of the potentiometer 13. Thus, the feedback voltage which is fed back to the point *g* is in the form of a D.C. voltage level and an A.C. voltage level.

Moreover, each value of the resistors 37, 38, 40, 44 and 47 is predetermined such that the divided constant voltage of point *f* becomes lower than the voltage of the point *g* when a command speed voltage is memorized in the memory circuit 3 when the potentiometer 13 is off. Therefore, the electric potential at the negative terminal of the differential amplifier 7 becomes higher than that at the positive terminal when the command speed voltage is memorized in the memory circuit 3 and the potentiometer 13 is positioned in its original position. Under this condition, the output of the differential amplifier 7 becomes null to turn off a transistor 48 so as to deenergize the solenoid windings 49 of the electromagnetic actuator 9.

Figure 4:
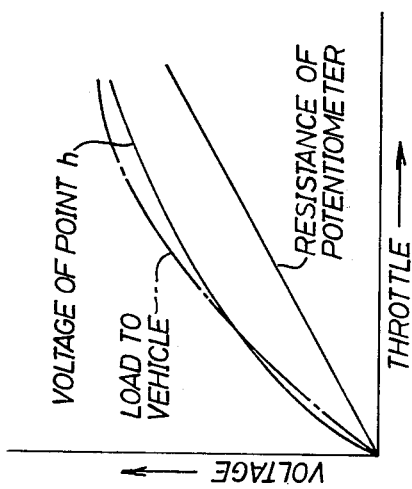
FIG. 4 is a graph showing the function of a feedback circuit adapted to the electronic control circuit shown in FIG. 2.

Furthermore, the negative feedback circuit 10 is characterized in that the resistor of the potentiometer 13 is connected in parallel to the resistor 42 so as to nonlinearly control the feedback voltage at point *h* in response to sliding movements of the slider 43 of the potentiometer 13, as shown in FIG. 4. Thus, when the slider 43 moves to increase the resistance value of the potentiometer 13 in proportion to the throttle movements, the feedback voltage applied to the point *g* will be non-linearly controlled such that the increasing ratio of the feedback voltage becomes smaller in accordance with an increase in the opening angle of the throttle. This improves the sensitivity and response of the speed control system when the vehicle throttle is opened wide to maintain the desired constant cruising speed of the vehicle, for instance, on a highway or a hill.

The electronic speed control circuit includes a power source circuit in which a main push-button switch 51 is connected at both ends thereof to a car battery 53 and a self-holding relay 54, and a brake switch 56 is connected at both ends thereof to the battery 53 and a stop signal lamp 55. In this power source circuit, upon actuation of the main switch 51 the relay 54 is energized to close the normally open contact 52 thereof, and upon actuation of the brake switch 56 the stop signal lamp 55 is lit and the relay 54 is deenergized to open the closed contact 52.

In operation of the electronic speed control system, the main switch 51 is actuated while the vehicle is travelling so that the contact 52 of the relay 54 is closed to supply energy from the battery to the electronic control circuit. When the vehicle reaches the desired constant crusing speed, the manual set switch 5 is actuated to momentarily turn on the field effect transistor 29, as previously described. Then, a voltage $Vb - Va$ is charged within the memory capacitor 4 so that a command speed voltage responsive to the desired speed of the vehicle is memorized in the memory capacitor 4 after the field effect transistor 29 is turned off. In this instance, the output voltage of the differential amplifier 7 is zero to make the vacuum motor 8 inoperative and the potentiometer 13 is positioned to have a minimum resistance value, as previously described.

Subsequently, when the actual speed of the vehicle decreases below the preset speed after the accelerator pedal 23 is released, a voltage with a frequency proportional to the decreased speed appears at the emitter point *a* of the transistor 26. Then, considering $Va$ as the initial voltage, when the voltage $Va$ decreases to $Va - X$, the voltage $Vb$ subsequently decreases to $Vb - X$, the letter X representing the magnitude of the voltage proportional to the decreased speed. A decreased voltage $Vb - X$ is then applied to the gate of field effect transistor 28 so that the output voltage $Ve$ of the memory circuit 3, which appears at the source of transistor 28, becomes smaller. Then the differential amplifier 7 generates an output voltage to turn on the transistor 48 and subsequently the solenoid windings 49 are energized to move the vacuum motor 8 so as to open the throttle valve 14. At the same time, the potentiometer 13 is operated in response to movement of the vacuum motor 8 to increase the feedback voltage appearing at the point *h*. As a result, the increased feedback voltage is applied to the point *g* to be applied to the negative terminal of the differential amplifier 7 with the output voltage of the field effect transistor 28.

Thus, when the voltage at point *g* becomes larger than that of the divided constant voltage at point *f* in accordance with an increase in the feedback voltage appearing at the point *g*, the output voltage of the differential amplifier 7 becomes null to deenergize the solenoid windings 49 of the actuator 9 so that the vacuum motor 8 becomes inoperative to decrease the degree of opening of the throttle valve 14. This operates the potentiometer 13 to decrease the feedback voltage and, in turn, the voltage at point *g* becomes smaller than that of the divided constant voltage at point *f* so that the differential amplifier 7 generates an output voltage to turn on the transistor 48 so as to actuate the vacuum motor 8. Consequently, the degree of opening of the throttle 14 is controlled to maintain the command speed of the vehicle such that the voltage at point *g* becomes essentially equal to the divided constant voltage at point *f*.

When the actual speed of the vehicle exceeds the command speed, for instance, on a down slope, the output voltage of the field effect transistor 28 increases in accordance with the increase in the speed signal voltage at point *a* and subsequently the voltage at point *g* becomes higher than the divided voltage at point *f* so that, as described above, the output voltage of the differential amplifier 7 becomes null to decrease the degree of opening of the throttle valve 14 so as to decelerate the vehicle by the action of engine brake. When the actual speed of the vehicle decreases below the command speed, for instance, on hills, curves, or rough roads, the output voltage of the field effect transistor 28 decreases in accordance with the decrease in the speed signal voltage at point *a* and subsequently the voltage at point *g* becomes lower than the divided voltage at point *f* so that the differential amplifier 7 generates an output voltage to turn on the transistor 48 so as to open the throttle valve 14.

To change the command speed mentioned above, the set switch 5 is actuated when the actual speed of the vehicle reaches a desired speed higher than the preset command speed by application of the accelerator pedal 23. This charges a desired higher command speed voltage in the memory capacitor 4. Conversely, to change the command speed to a decreased speed, the brake switch 56 is closed by depression of the brake pedal to disconnect the electronic control circuit from the electric source in the form of the car battery 53. As a result, the vacuum motor 8 becomes inoperative to close the throttle valve 14 and thereafter both the main switch 51 and the set switch 5 are actuated when the actual speed of the vehicle drops down to the desired low speed. This charges the desired lower command speed voltage in the memory capacitor 4.

Figure 3:
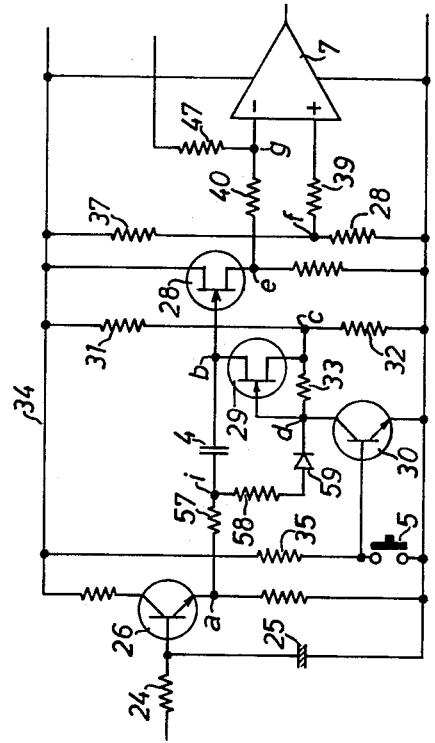
FIG. 3 shows a modification of the electronic control circuit shown in FIG. 2.

In FIG. 3 there is illustrated a modification of the above-mentioned memory circuit 3 wherein a voltage divider composed of resistors 57 and 58 is interposed between the emitter point a of the transistor 26 and the collector of the transistor 30 by way of a diode 59. The diode 59 is connected at its cathode to the collector of the transistor 30 and is connected at its anode in series with the resistor 58. Thus, the memory capacitor 4 is connected at one end thereof to the output terminal $i$ of the voltage divider circuit to receive a divided speed signal voltage.

Figure 5:
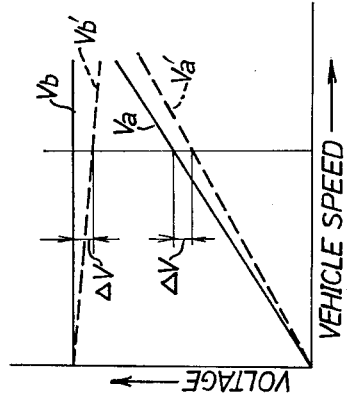
FIG. 5 is a graph showing the function of a compensation circuit adapted to the modification of FIG. 3.

With this modification, when the transistor 30 is turned on by the opening of the set switch 5, the voltage divider circuit having the resistors 57 and 58 becomes operative so that a speed signal voltage appearing at the emitter of the transistor 26 is regulated at the point $i$ by the operation of the voltage divider circuit, as shown by dotted lines in FIG. 5. When the set switch 5 is momentarily closed to turn off the transistor 30 and turn on the field effect transistor 29, the voltage divider circuit becomes inoperative and, thus, the speed signal voltage appearing at the emitter of the transistor 26 is directly applied to the memory capacitor 4, as shown by a solid line in FIG. 5, so that the command speed signal voltage $Vb - Va$ is memorized in the capacitor 4.

In other words, the voltage divider circuit becomes inoperative upon actuation of the set switch 5 to charge the voltage $Vb - Va$ in the memory capacitor 4 as a command speed signal. In this instance, the electric potential at the point $i$ and the electric potential at the point $b$ are respectively indicated by solid lines in FIG. 5. Thereafter, the voltage divider circuit becomes operative upon release of the set switch 5 to compensate for the instantaneous speed signal voltage appearing at the points $i$ and $b$, as shown by $\Delta V$ in FIG. 5. This means that the error signal applied to the negative terminal of the differential amplifier 7 is subsequently controlled to compensate for the operation of the negative feedback circuit 10.

Having now fully set forth both the structure and operation of preferred embodiments of the concept underlying the present invention, various other embodiments as well as certain variations and modifications of the embodiments herein shown and described will obviously occur to those skilled in the art. It is to be understood, therefore, that within the scope of the appended claims, the invention may be practiced otherwise than as specifically set forth herein.

What is claimed is:

1. In an electronic control system for use in automatically controlling the speed of a vehicle having an actuator for a throttle valve of the vehicle, comprising:
    means for generating a speed signal voltage proportional to the actual speed of the vehicle;
    a memory circuit including a memory capacitor and a first high input impedance amplifier, said capacitor connected at one end thereof to an output terminal of said speed signal voltage generating means and at the other end thereof to a control electrode of said first high input impedance amplifier;
    setting means for momentarily connecting a constant voltage circuit to a common junction between said control electrode of said first high input impedance amplifier and said memory capacitor to store a command speed voltage in said memory capacitor in response to said speed signal voltage generated by said speed signal voltage generating means; and
    a comparison circuit connected to said memory circuit for operating said throttle valve actuator by comparing the output voltage of said first high input impedance amplifier with a reference voltage;
    wherein said setting means comprises a second high input impedance amplifier having an input terminal connected to said constant voltage circuit and having an output terminal connected to said common junction between said memory capacitor and said first high input impedance amplifier, and manual control means connected to the control electrode of said second high input impedance amplifier to normally deenergize said second high input impedance amplifier and to momentarily energize said second high input impedance amplifier upon actuation of said manual control means.

2. An electronic speed control system as claimed in claim 1, further commprising a voltage divider circuit and a diode interposed between the output terminal of said speed signal voltage generating means and said manual control means, the cathode of said diode connected to said manual control means, the anode of said diode connected to said voltage divider circuit and wherein said memory capacitor is connected to an output terminal of said voltage divider circuit.

3. An electronic speed control system as claimed in claim 1, further comprising a resistor interposed between said control electrode of said second high input impedance amplifier and said constant voltage circuit to normally deenergize said second high input impedance amplifier and to momentarily energize said second high input impedance amplifier upon actuation of said manual control means.

4. An electronic speed control system as claimed in claim 3, wherein said constant voltage circuit comprises a voltage divider circuit connected to a source of electrical energy.

5. An electronic speed control system as claimed in claim 3, wherein said manual control means comprises a transistor having a collector connected to said control electrode of said second high input impedance amplifier and a grounded emitter, and a normally open switch means for momentarily connecting a source of electrical energy to the base of said transistor.

6. An electronic speed control system as claimed in claim 5, further comprising a voltage divider circuit and a diode interposed between the output terminal of said speed signal generating means and the collector of said transistor, said diode having a cathode connected to the collector of said transistor and an anode connected to said voltage divider circuit and wherein said memory capacitor is connected to an output terminal of said voltage divider circuit.

7. An electronic speed control system as claimed in claim 1, wherein said first and second high input impedance amplifiers each comprise a field effect transistor.

8. An electronic speed control system as claimed in claim 1, further comprising a negative feedback circuit means connected to said comparison circuit to compensate for the output voltage of said first high input impedance amplifier in accordance with the operation of said throttle valve actuator.

9. An electronic speed control system as claimed in claim 8, wherein said negative feedback circuit means comprises a variable resistor which is operated in response to the degree of opening of said throttle valve actuator, a second resistor in parallel with said variable resistor, and a third resistor in series with said variable resistor and said second resistor, the common junction between said second and third resistors being connected to said comparison circuit.

* * * * *